United States Patent [19]

Hostettler

[11] 4,197,372

[45] Apr. 8, 1980

[54] SEMI-FLEXIBLE POLYURETHANE FOAMS CONTAINING AMYLACEOUS MATERIAL AND PROCESS FOR PREPARING SAME

[75] Inventor: Fritz Hostettler, Freehold, N.J.

[73] Assignee: Krause Milling Company, Milwaukee, Wis.

[21] Appl. No.: 869,431

[22] Filed: Jan. 16, 1978

[51] Int. Cl.$^2$ .................. C08G 18/14; C08G 18/48; C08G 18/76

[52] U.S. Cl. .................. 521/109; 127/71; 521/112; 521/116; 521/124; 521/129; 521/160; 521/174; 521/175

[58] Field of Search ............... 260/2.5 AD, 2.5 AM, 260/2.5 AJ; 521/175, 109, 102–106, 121, 124–130; 127/71

[56] References Cited

U.S. PATENT DOCUMENTS

| | | | |
|---|---|---|---|
| 2,908,657 | 10/1959 | Boggs | 260/9 |
| 3,004,934 | 10/1961 | Dosmann | 260/2.5 AK |
| 3,165,508 | 1/1965 | Otey et al. | 260/210 |
| 3,277,213 | 10/1966 | Fuzesi | 260/233.3 |
| 3,402,170 | 9/1968 | Fuzesi et al. | 260/233.3 |
| 3,405,080 | 10/1968 | Otey et al. | 260/9 |
| 3,485,669 | 12/1969 | Kunze | 127/71 |
| 3,600,338 | 8/1971 | Molotsky | 260/2.5 AS |
| 3,655,590 | 4/1972 | Moss et al. | 521/175 |
| 3,674,717 | 7/1972 | Fuzesi et al. | 260/2.5 AS |
| 3,956,202 | 5/1976 | Iwasaki | 260/2.5 AJ |
| 3,957,702 | 5/1976 | Molotsky et al. | 260/2.5 AR |

FOREIGN PATENT DOCUMENTS

| | | | |
|---|---|---|---|
| 2448216 | 4/1975 | Fed. Rep. of Germany | 260/2.5 AJ |
| 4218356 | 9/1967 | Japan | 521/109 |
| 5173598 | 6/1976 | Japan | 521/109 |

OTHER PUBLICATIONS

German Laid Open Patent Application (English Translation) 24 48 216, Apr. 10, 1975.
Bennett et al., Jour. Cellular Plastics, Aug., 1967, pp. 1–5.

*Primary Examiner*—H. S. Cockeram
*Attorney, Agent, or Firm*—Michael, Best & Friedrich

[57] ABSTRACT

Semi-flexible, shock-absorbing polyurethane foams containing an amylaceous material, such as a cereal starch or flour, and having an open cell structure are prepared by co-reacting the amylaceous material and a polyether with an aromatic polyisocyanate having a functionality of about 2 to about 2.4. The foams are particularly useful in crash padding.

15 Claims, No Drawings

SEMI-FLEXIBLE POLYURETHANE FOAMS CONTAINING AMYLACEOUS MATERIAL AND PROCESS FOR PREPARING SAME

BACKGROUND OF THE INVENTION

This invention relates to semi-flexible, shock-absorbing polyurethane foams. More particularly, this invention relates to the above type foams containing an amylaceous material and having an open cell structure and a process for preparing same.

Semi-flexible or semi-rigid polyurethane foams are used for various applications. One specific area of application is in automobiles as crash padding for instrument panels, trim, sun visors, horn buttons, arm rests, and the like. Foams for these applications typically are prepared by reacting an organic polyisocyanate with a polyether in the presence of a blowing agent, a catalyst, and, optionally, in the presence of cross linking agents, surfactants, plasticizers, stabilizers, dyes, fillers and pigments. The articles themselves usually are produced by vacuum forming an embossed, flexible thermoplastic sheet, e.g. an acrylonitrile-butadiene-styrene copolymer (ABS) or polyvinyl chloride, to the inside surface of a mold, pouring the mixed foam ingredients into the mold on top of the sheet, and then closing the mold and allowing the foaming reaction to proceed.

Foams used for this purpose preferably should have a high modulus per unit density in order to provide the desired shock absorption at a minimum density, have an open cell structure so as to prevent shrinking during post-cure cooling, and be resistant to deterioration upon aging and exposure to moisture, oxygen, etc. Of course, a reduction in the production cost for these foams is highly desirable.

The use of low cost starches in various types of polyurethane foams including semi-flexible or semi-rigid foams has been proposed. The direct addition of starch along with the other conventional foam ingredients, such as in a "one-shot" process, generally has not been satisfactory because the foams have poor physical properties; the most undesirable of which is a closed cell structure with an attendant undesirable shrinking during post-cure cooling. Such shrinkage usually results in the final molded product having out-of-tolerance dimensions for the intended use.

Examples of prior art processes employing starches in polyurethane foams include U.S. Pat. No. 2,908,657 (Boggs) which discloses the incorporation of various starches into a polyurethane foam by adding the starch to a completely reacted liquid reaction product of a polyester and a diisocyanate. Boggs teaches it is essential that the polyester and diisocyanate be mixed and completely reacted before the starch is incorporated; otherwise, the resultant foam product has poor tear resistance and tensile strength. U.S. Pat. No. 3,004,934 (Dosmann et al) discloses the addition of starches to a liquid prepolymer formed by reacting an organic polyisocyanate with a polyether or a polyester to produce semi-flexible foams having predominantly closed cells. German Patent Application No. 2,448,216, published Apr. 10, 1975, discloses the use of a carbohydrate filler, such as a starch, in polyurethane foams employing a polysicocyanate having a relatively high functionality. Applicant has found that foams including an amylaceous material, such as a cereal starch or flour, and prepared by a "one-shot" process have a closed cell structure, with an attendant undesirable shrinking during post-cure cooling, when an organic polyisocyanate having a functionality in the order of 2.6 to 2.7 is used.

Prior attempts to overcome the difficulties associated with incorporating starches directly into polyurethane foams include using oxyalkylated starches, using polyhydroxypolyoxyalkylene ethers formed by reacting starch with a polyhydric alcohol in the presence of an acid catalyst and then oxyalkylating the resulting reaction mixture as disclosed in U.S. Pat. Nos. 3,227,213 (Fuzesi) and 3,402,170 (Fuzesi et al), and using alkoxylated starch hydrolysates as disclosed in U.S. Pat. No. 3,600,338 (Molotsky).

U.S. Pat. Nos. 3,165,508 (Otey et al), 3,405,080 (Otey et al), and 3,655,590 (Moss et al) disclose the use of starch-based polyols in the production of rigid and flexible polyurethane foams. Attention is also directed to U.S. Pat. Nos. 3,674,717 (Fuzesi et al) and 3,957,702 (Molotsky et al) which disclose the use of phosphorous derivatives of starch polyethers or starch polyether hydrolysates to produce flame retardant polyurethane foams. An article entitled "Rigid Urethane Foam Extended with Starch," in the *Journal of Cellular Plastics*, August 1967, discloses that rigid polyurethane foams containing starch and made with conventional polyethers do not have acceptable physical properties.

SUMMARY OF THE INVENTION

A principal object of the invention is to provide low cost, semi-flexible polyurethane foams which are particularly adaptable for use in crash padding and a process for producing same.

Another principal object of the invention is to provide a "one-shot" process for producing semi-flexible, shock-absorbing polyurethane foams which contain an amylaceous material and yet have an open cell structure.

A further principal object of the invention is to provide semi-flexible, shock-absorbing polyurethane foams containing an amylaceous material, having an open cell structure and including a minimum number of unreacted end groups.

A still further object of the invention is to provide semi-flexible polyurethane foams having improved strength and load bearing properties.

Other objects, aspects and advantages of the invention will become apparent to those skilled in the art upon reviewing the following detailed description and the appended claims.

It has been found that semi-flexible, shock-absorbing polyurethane foams containing from about 3 to about 35 weight % of an amylaceous material and having an open cell structure can be produced from conventional polyethers with a "one-shot" process by using an organic polyisocyanate having a functionality of about 2 to about 2.4. The inclusion of an amylaceous material, such as a cereal starch or flour, and an organic polyisocyanate having a functionality lower than that of polyisocyanates normally used in semi-flexible, shock-absorbing polyurethane foam formulations permits the use of an isocyanate index of 100 or higher and still results in a foam product, having an open cell structure.

As used herein, the term "isocyanate index" means the product of 100 times the quotient of the amount of NCO equivalents in the foam-forming ingredients divided by the amount of reactive hydrogen equivalents in the foam forming ingredients including water, hydroxyl groups, amines, etc. The combination of a lower polyisocyanate functionality and high isocyanate index results in the production of foams which are less vulnerable to hydrolytic attack because the number of unreacted end groups is minimized or even completely eliminated in some cases. The physical properties of the resultant foams are comparable to, and in some respects are superior to, those of conventional semi-flexible, shock-absorbing foams even though a substantial amount of the polyether is replaced with a low cost amylaceous material and the foam product has a significantly lower density.

DESCRIPTION OF THE PREFERRED EMBODIMENTS

The polyethers employed for preparing the polyurethane foams are well known and contain terminal hydrogen-containing groups which are reactive with isocyanates. Particularly adaptable polyethers are the linear or branched alkylene oxide adducts of polyhydric alcohols, polyhydric polythioethers, polyacetals, aliphatic polyols and thiols, ammonia, aliphatic, aromatic and heterocyclic amines and other compounds containing active hydrogen-containing groups which are reactive with alkylene oxide. Suitable alkylene oxides include ethylene oxide, propylene oxide, butylene oxide, styrene oxide, amylene oxide and homo or block copolymers of these alkylene oxides. Suitable polymerization initiators include glycerol, trimethylolpropane, triethanolamine, diethylene glycol, ethylenediamine, phenolformaldehyde condensation products, aniline-formaldehyde condensation products, pentaerythritol, sorbitol, sucrose, and the like. The polyethers may include vinyl polymers, such as acrylonitrile, styrene and mixtures thereof, grafted thereto.

The preferred polyethers are homo and block copolymers of propylene oxide and another alkylene oxide and most preferably are block copolymers of propylene oxide and ethylene oxide with the ethylene oxide being the outer block. The polyethers may contain both primary and secondary hydroxyl groups. Preferably, at least 50%, and most preferably at least 60%, of the terminal hydroxyl groups are primary, by function, so as to increase the activity with the polyisocyanate and, thus, the rate of curing. The molecular weight of the polyethers can be up to about 6,000 or higher and preferably is about 3,000 to about 6,000. The equivalent weight per hydroxyl group of the total number of ingredients generally used in crash pad formulae is within the range of about 300 to about 2,000, preferably about 400 to about 2,000, and most preferably 500 to about 1,800.

Suitable amylaceous materials include high starch-bearing fractions of various cereal grains and tubers, such as corn, rice, wheat, barley, sorghum, potato and tapioca; and waxy and high amylose varieties of corn, sorghum, wheat, and the like. The amylaceous material can be in the form of a dry milled or wet milled product, such as a flour or a starch. It can be used in unmodified form or modified by treatment with acids, alkalis, and enzymes or with oxidizing, etherifying or esterifying agents. Also, it can be thermally modified to produce pregelatinized starches and flours, or to produce dextrins and the like. Pregelatinized amylaceous materials, which are particularly suitable, include products produced from starches and flours on extruder-cookers, steam rolls, gas-fired rolls and the like. These pregelatinized products can be used without further treatment or modified with an acid or other modifying agents such as those disclosed in U.S. Pat. No. 3,983,084.

In amylaceous materials which have not been modified, a number of the hydroxyl groups present in the starch granule are bound in highly crystalline regions and, apparently for this reason, are not capable of rapidly reacting with isocyanate groups. Foams prepared with pregelatinized amylaceous materials generally have been found to have superior curing characteristics and physical properties. While not completely understood at this time, it appears that pregelatinized amylaceous materials are more reactive because more hydroxyl groups are made accessible for reaction by virtue of the swelling and rupturing of the starch granule which occurs during the gelatinization process. Accordingly, pregelatinized amylaceous materials presently are preferred, with pregelatinized cereal starches and flours being the most preferred.

The amount of amylaceous material used can be within the range of about 5 to about 90, preferably about 20 to about 60, and most preferably about 30 to about 45, parts by weight per 100 parts of the polyether used in the foam-forming reaction system. The final foam product contains about 3 to about 35, preferably about 10 to about 25, and most preferably about 15 to about 20, weight % of the amylaceous material, based on a total weight of the foam.

The amylaceous materials usually contain some quantity of moisture which can vary over a relatively broad range depending on the source of the particular amylaceous material, the type of processing, atmospheric conditions during storing, transportation and handling, etc. Moisture present in the amylaceous material can participate in the foaming reaction and cause a nonuniform foaming rate which can, in some instances, adversely affect the physical characteristics of the final foam product. Accordingly, it is preferable to use amylaceous materials which are substantially free of moisture in order to obtain a reaction system having a predeterminable balanced stoichiometry of isocyanate equivalents and the reactive hydrogen equivalents which will produce a final foam having the proper balance of these equivalents.

To meet this desideratum, the moisture content of the amylaceous material preferably is adjusted downwardly to less than about 1 weight % prior to introduction into the foam-forming system. This can be conveniently accomplished by employing a suitable drying technique, such as freeze drying, vacuum drying, flash drying, spray drying or drying in air at a temperature of about 100° to about 120° C. for about 6 to about 24 hours or until a constant weight is obtained.

It has been found that many amylaceous materials, particularly cereal starches and flours, contain oxidation products which can interfere with the foam-forming reaction after being stored for some time at ambient conditions or dried in an oxidizing atmosphere. Corn starches and flours and other cereal products typically contain polysaccharides, proteins and fats. Some portion of the cereal product apparently is oxidized to form oxidation products, such as hydroperoxides, peroxides, ozonides, etc., which tend to interfere with the foam-forming reaction. Whether these oxidation products are formed predominantly from the fatty acid portion of the cereal product or also formed partly from the protein or carbohydrate fractions is not completely understood at this time.

This potential difficulty can be minimized by stabilizing the amylaceous material against oxidation prior to drying. Such stabilization can be effected by treating the amylaceous material with a stabilizing agent including an effective amount of one or more antioxidants capable of inhibiting the formation of oxidation products or, alternatively, by removing substantially all, or at least a major portion, of the oxidizable and/or oxidized materials, particularly fatty acids or fats, contained by the amylaceous material. When the amylaceous material is stabilized, use of a stabilizing agent is presently preferred because of generally lower processing costs.

Suitable antioxidants for use as the stabilizing agent include those which act as free radical scavengers and those which act more like a reducing agent and break down or decompose oxidation products. The first type of antioxidants act primarily to terminate the propagation of chain reactions which accelerate the oxidation process. That is, they serve to minimize the formation of hydroperoxides, peroxides, ozonides and similar oxidation products which tend to interfere with the foaming reaction and, thus, are referred to herein as primary antioxidants. The second type of antioxidants are more effective in breaking down or decomposing hydroperoxides, peroxides, ozonides and similar oxidation products into hydroxyl compounds, aldehydes, acids, ect., which generally do not interfere with the reaction and, thus, are referred to herein as secondary antioxidants. Stabilizing agents including a mixture of primary and secondary antioxidants have been found to be particularly effective and presently are preferred.

Suitable primary antioxidants include conventional antioxidants known to be free radical scavengers such as phenolic antioxidants, both hindered phenolics and polyhydroxy phenolics, and secondary amines.

Representative examples of suitable hindered phenolic antioxidants include alkylated phenols, such as butylated hydroxytoluene (2,6-di-tert-butyl-p-cresol), butylated hydroxyanisole (15% 2-tert-butyl-4-hydroxyanisole and 85% 3-tert-butyl-4-hydroxyanisole), 2,6-di-tert-butyl-4-hydroxymethylphenol, and 2,6-di-tert-butyl-4-stearylphenol; alkylidene bisphenols, such as 2,2'-methylene-bis-(6-tert-butyl-p-cresol), 2,2'-butylidene-bis-(6-tert-butyl-m-cresol), 4,4'-butylidene-bis-(6-tert-butyl-m-cresol), 4,4'-cyclohexylidene-bis-(2-cyclohexylphenol), 4,4'-methylene-bis-(2,5-di-tert-butylphenol), and 2,2'-methylene-bis-6-(1-methylcyclohexyl)-p-cresol; thiobisphenols which are the reaction products of sulfur chloride and alkylated phenols, such as 4,4'-thio-bis-(6-tert-butyl-m-cresol), thio-bis-(di-sec-amyl phenol) and the reaction product of 6-tert-butyl-m-cresol and sulfur chloride; polyphenols, such as 1,1,3-tris-(2-methyl-4-hydroxy-5-tert-butylphenyl) butane, tetrakis [methylene (3,5-di-tert-butyl-4-hydroxy cinnamate)] methane, 1,3,5-trimethyl-2,4,6-tris (3,5-di-tert-butyl-4-hydroxybenzyl) benzene, di-(3,5-di-tert-butyl-4-hydroxybenzyl) ether, di-(3,5-di-tert-butyl-4-hydroxyphenyl) methane, 2,4,6-tri-(3',5'-di-tert-butyl-4-hydroxybenzyl) phenol, and 2,4,6-tri-(3',5'-di-tert-butyl-4'-hydroxybenzyl) mesitylene; thiodiethylene bis-(3,5-di-tert-butyl-4-hydroxy) hydrocinnamate; and the tocopherols.

Representative examples of suitable polyhydroxy phenolic antioxidants include esters of gallic acid, such as propyl gallate, octyl gallate, and dodecyl gallate; nordihydroguaiaretic acid (2,3-dimethyl-1,4-bis) (3,4-dihydroxyphenyl) butane; 2,4,5-trihydroxybutyrophenone; p-tert-butyl cathechol; cathechol; and the like.

Representative examples of suitable secondary amines include diphenylamines, such as octyl diphenylamine; phenylenediamines, such as N-isopropyl-N'-phenyl-p-phenylenediamine; alkylenediamines, such as N,N'-diphenylethylenediamine; and naphthylamines, such as phenyl-$\beta$-naphthylamine and beta-methyl naphthylamine.

Other suitable free radical scavenger antioxidants include gum guaiac and ethoxyguin.

Suitable secondary antioxidants include organophosphites or alkylated aryl phosphites, particularly alkylated phenol phosphites such as (tris) nonyl phenyl phosphite and hindered phenol phosphites, esters of thiopropionic acids, such as dilaurylthiodipropionate, thiocarbamates, dithiocarbamates, and the like. Dilaurylthiodipropionate has been found to be particularly effective and presently is the preferred secondary antioxidant.

The stabilizing agent, either one or more primary antioxidants alone or a mixture of primary and secondary antioxidants, can be admixed with the amylaceous material in a suitable manner. For example, the antioxidant(s) can be dissolved in a suitable solvent which does not fractionate or otherwise deleteriously affect the starch portion of the amylaceous material and the resultant solution thoroughly admixed with the amylaceous material in conventional blending equipment. Suitable solvents include alcohols, such as methanol, ethanol and isopropanol (but not butanol and other alcohols which fractionate starch); ketones, such as methyl ethyl ketone; hydrocarbons, such as hexane, pentane, heptane and pentene; and halogenated hydrocarbons, such as methylene chloride, ethylene chloride and the like. Alternately, the antioxidant(s) can be dry blended with the amylaceous material in conventional blending apparatus, such as a Waring blender, a ribbon blender or a high intensity blender.

When used, the amount of stabilizing agent admixed with the amylaceous material varies depending on the particular amylaceous material being treated, so long as an effective amount of the antioxidant(s) is added to inhibit the formation of appreciable amounts of oxidation products in the amylaceous material upon exposure to an oxidizing atmosphere during drying or storage prior to drying. Generally, the amount of the antioxidant(s) can vary from a few parts per million up to 1 weight % or more, based on the total weight of the amylaceous material prior to drying. The amount of stabilizing agent used, as the weight of antioxidant(s), preferably is about 0.03 to about 0.6, most preferably about 0.1 to about 0.5, weight %, based on the total weight of the amylaceous material prior to drying. When a mixture of primary and secondary antioxidants is used, the proportion of the primary antioxidant usually is less than the secondary antioxidant.

As mentioned above, the amylaceous material also can be stabilized by removing substantially all, or at least a major portion, of the oxidizable and/or oxidized materials, particularly fatty acids or fats. This can be conveniently accomplished by extracting the oxidizable and/or oxidized materials with a suitable organic solvent which does not fractionate or otherwise deleteriously affect the starch portion of the amylaceous material. Suitable solvents for this purpose include those mentioned above for use in the stabilizing agent.

After the amylaceous material has been stabilized, either by treatment with a stabilizing agent or by removal of the oxidizable and/or oxidized materials, it can be dried to the desired moisture content for use in the foam-forming reaction system. If the dried stabilized amylaceous material is not to be used within a relatively short period of time after drying, it should be stored in a moisture-tight container or package for future use. As indicated above, the undesirable oxidation products can be formed during prolonged storage of amylaceous materials under atmospheric conditions. Accordingly, the amylaceous material should be stabilized at the earliest possible stage of processing prior to drying. For example, when a pregelatinized cereal starch or flour is used, the stabilizing agent can be admixed therewith prior to the gelatinization process or within a relatively short time thereafter prior to storage.

While the use of stabilized amylaceous materials is preferred, unstabilized amylaceous materials can be used to produce semi-flexible foams having acceptable physical properties. This is particularly true for amylaceous materials which have not been stored in an oxidizing atmosphere for an extended time or have been dried in a non-oxidizing atmosphere, such as by freeze drying.

The organic polyisocyanates employed preferably are the aromatic type and most preferably are crude phosgenation products of formaldehyde-aniline condensates, such as a crude diphenylmethane diisocyanate and derivatives thereof. Various other conventional organic polyisocyanates, such as crude toluene diisocyanates or pure toluene diisocyanates, can be used. In order to obtain a semi-flexible polyurethane foam having acceptable shock absorbing properties and an open cell structure, the functionality of the polyisocyanate must be about 2 to about 2.4, preferably about 2.2 to about 2.3. Polyisocyanates having a functionality higher than about 2.4 have been found to produce a closed cell structure when conventional polyethers are employed and an amylaceous material is added directly to the other foam-forming ingredients.

A sufficient amount of the polyisocyanate is added to provide an isocyanate index, factoring in all the reactive equivalents in the reaction mixture, of about 80 to about 150, preferably about 90 to about 130, and most preferably about 100 to about 125. When the amount of the polyisocyanate is stoichiometric or in excess of stoichiometric with respect to all the reactive equivalents, i.e., the isocyanate index is 100 or more, all or substantially all of the reactive end groups participate in the reaction resulting in a final product which is highly resistant to hydrolytic attack. The number of reactive groups in the amylaceous material will vary considerably depending on the particular type. For example, pregelatinized cereal starches and flours and partially hydrolyzed cereal starches and flours usually contain a substantially higher number of reactive groups than unmodified cereal starches and flours.

Prior art processes for producing semi-flexible, shock-absorbing foams typically must operate with an isocyanate index within the range of about 90 to about 92 in order to obtain an open cell structure and the relatively stiff or "dead" property desired for shock absorbing. By using an amylaceous material and an organic polyisocyanate having a functionality of about 2 to about 2.4 in accordance with the invention, the isocyanate index can be increased to 100 or higher and a foam having an open cell structure is still obtained.

Water is used as the primary blowing agent. Water reacts with the polyisocyanate to produce carbon dioxide which provides the desired expansion and cell formation and urea linkages which are an added source of active hydrogen in the reaction system. The amount of water used preferably is within the range of about 2 to about 5, most preferably about 2.5 to about 4 parts by weight per 100 parts of the polyether. The density can be reduced by increasing the amounts of water and polyisocyanate; however, the hardness of the foam usually will not be reduced. When lower density and softer foams are desired, a conventional organic blowing agent can be added as an auxiliary blowing agent.

Suitable auxiliary blowing agents include low boiling-point liquids which vaporize at the exothermic reaction temperature of the reaction mixture, e.g., have boiling points less than 100° C., and are inert with respect to the polyisocyanate. Representative examples of such liquids include low boiling hydrocarbons such as pentane, hexane, heptane, pentene, and heptene and halogenated hydrocarbons such as methylene chloride, ethylene chloride, vinylidene chloride, trichloromonofluoromethane, dichlorodifluoromethane, dichloromonofluoromethane, monochlorodifluoromethane, dichlorotetrafluoroethane, 1,1,2-trichloro-1,2,2-trifluoroethane, dibromofluoromethane, and monobromotrifluoromethane. Mixtures of these liquids can be used.

The catalyst employed can be any conventional catalyst known to catalyze the isocyanate reaction and usually consists of tertiary amines, organo metallic compounds, or mixtures thereof. Suitable tertiary amines include triethylenediamine, dimethylethanolamine, triethanolamine, N-ethylmorpholine, N-methyldicyclohexylamine, N,N-dimethyl cyclohexylamine, N,N,N',N'-tetramethyl-1,3-butanediamine,bis (dimethylamino ethyl) ether, bis (dimethylamino propyl) ether, and the like. A tertiary amine either alone or in combination with another tertiary amine which is particularly useful for the gas blowing reaction is the preferred catalyst system.

The use of conventional organic metallic catalysts including tin acylates, such as stannous octoate, tin compounds, such as stannous chloride, and tin salts of carboxylic acids, such as dibutyltin-di-2-ethyl hexoate, which are extremely active catalysts in promoting the reaction between the hydroxyl moities of the polyether and the polyisocyanates, can also be employed, but are not essential. The total amount of catalyst employed is usually within the range of about 0.1 to about 5, preferably about 1.0 to about 3, parts by weight per 100 parts of the polyether.

Amylaceous materials appear to act as cross linking agents in the reaction system. Accordingly, cross linking agents commonly used in prior art processes to produce a stiff or "dead" foam usually are not required; particularly when higher amounts of the amylaceous material are used and/or high stiffness is not desired. The presence of small amounts of such cross linking agents in prior art foam formulations usually meant that an isocyanate index of less than 100 had to be used in order to obtain the desired open cell structure. One of the advantages of the invention is that all or some of the cross linking agent can be replaced by the amylaceous material, which means that an isocyanate index of 100 or higher can be used and still obtain an open cell structure.

Notwithstanding the desirability of minimizing the content of or eliminating cross linking agents, small amounts, for example, about 0.5 to about 10 parts by weight per 100 parts of the polyether, can be used when stiffer foams are desired. Suitable cross linking agents include triethanolamine, triisopropylamine, N,N,N',N'-tetrakis-(2-hydroxypropyl)-ethylene diamine, lower molecular weight 1,2-alkylene oxide adducts of trimethylol propane, glycerol, pentaerythritol, sorbitol and the like. It has been found that about 1 part of triethanolamine per 100 parts of the polyether is particularly adaptable for facilitating de-molding.

While not absolutely necessary in many cases, conventional surfactants can be employed to minimize foam collapse, particularly at the mold edges, and to enhance more uniform cell size. Suitable surfactants include well known siloxaneoxyalkylene copolymers and other organopolysiloxane fluids, oxyethylated alkylphenols, oxyethylated fatty alcohols and polyoxyalkylene block copolymers. When used, the amount of the surfactant normally is about 0.1 to about 2 parts by weight per 100 parts of the polyether.

Since amylaceous materials generally are biodegradable, it may be desirable to add a small amount of a suitable mildewcide for some applications. Suitable mildewcides include derivatives of mercury, arsenic and tin, such as tributyltin salicylate (e.g., Cotin 234, marketed by Cosan Corp.) and 10,10'-oxybis-phenoxyarsine (e.g., Vinyzene BP-5-2-DOP, marketed by Ventron Corp.). When used the amount of mildewcide usually is about 0.03 to about 3 parts by weight per 100 parts of the amylaceous material.

If desired, various suitable dyes or pigments, such as carbon black, can be added for coloring purposes.

The presence of the amylaceous material in the foam product increases the compression or the modulus per unit density of the final foam product. That is, a polyurethane foam of the invention containing about 20 weight % corn starch or flour has substantially higher compression load characteristics at 25% deflection than a conventional polyurethane foam containing no amylaceous material. It has been found that a polyurethane foam of the invention containing about 20 weight % of corn starch can be foamed to a density which is 20–25% less than a conventional polyurethane foam containing no amylaceous material and still has substantially the same load deflection characteristics and superior tensile and tear strengths. Thus, the use of an amylaceous material in accordance with the invention provides a two-prong economic advantage. First, substantial amounts of more expensive ingredients used in prior art foam formulations can be replaced with a low cost amylaceous material without reducing the strength properties. Second, a foam of lower density having a specific degree of resistance to impact can be made. This reduction in density means that less raw materials are required for a given molded part.

Semi-flexible, shock-absorbing polyurethane foams of the invention can be prepared by employing equipment and mixing procedures used in "one-shot" processes for making conventional semi-flexible polyurethane foams. For example, each ingredient or component of the formulations can be admitted to a mixing head through individual feed lines at ambient temperatures. The polyether and amylaceous materials preferably are mixed together prior to introduction into the mixing head. Other ingredients added in small amounts, such as the surfactant and the pigment (if used), can be introduced into the polyether line upstream of the mixing head or, alternately, in-line blenders can be used to premix the ingredients before they reach the mixing head. It is usually preferable to add the polyisocyanate as a separate stream to the mixing head. The control orifice sizes, line pressures, dispensing rates, stream temperatures, and other operating parameters are adjustable in accordance with well-known procedures.

When molded parts, such as crash pads for automotive instrument panels are made, the foam ingredients are poured into a closeable mold containing a sheet material. The molding operation can be carried out at ambient temperatures or the mold heated to moderate temperatures of about 50° C. Slab stocks can be made by pouring the foam ingredients into an open top box or mold. While the foams can be cured at ambient temperature, it is sometimes desirable to post cure them at temperatures from about 50° to about 100° or more to accelerate curing.

Without further elaboration it is believed that one skilled in the art can, using the preceding description, utilize the present invention to its fullest extent. The following examples are presented to illustrate the invention and are not to be construed as limitations thereto.

EXAMPLE 1

A series of tests was performed in an attempt to prepare semi-flexible polyurethane foams containing an amylaceous material in varying amounts and having physical properties suitable for use as crash pads. The amylaceous material was a pregelatinized corn flour prepared by an extrusion-cooking process in the presence of urea as disclosed in U.S. Pat. No. 3,983,084 and the foams were prepared by hand foaming. The foam formulations for these tests are listed in Table I.

All the ingredients, except the polyisocyanate, were added to a 1-pint, polyethylene-lined, paper ice cream cup. The auxiliary blowing agent (if used) and the catalyst were added last. This mixture was stirred for a short time after the addition of each ingredient and then for about 3–5 minutes after all the ingredients had been added to insure a thorough dispersion. After the polyisocyanate was added, the resultant mixture was stirred for up to 10 seconds, depending on the creaming time of the particular system, then transferred to 1-quart, polyethylene-lined, paper ice cream cups for foaming. The cream, rise and other pertinent cure times were measured. The foams were inspected for the type of cell structure and measured for density. The curing characteristics and physical properties of the foams are summarized in Table II.

From these results, it can be seen that foams including amylaceous material, i.e., corn flour, and employing a polyisocyanate having a functionality of 2.6–2.7 either exhibited shrinkage because of a closed cell structure (Run 2), did not rise properly (Run 3), or had an inconsistent cell size (Runs 4–6).

EXAMPLE 2

In a second series of tests run in the same manner as Example 1, the same corn flour was used but the polyisocyanate was replaced with one having a functionality of 2.2–2.3. The foam formulations for these tests are listed in Table III and the curing characteristics and physical properties of the foams are listed in Table IV.

EXAMPLE 3

A series of tests were run in substantially the same manner as Example 1 using different types of amylaceous materials. The foam formulations for these tests are listed in Table V. The following amylaceous materials were used in these tests: Run 13=pregelatinized, urea-modified corn flour as in Example 1, Runs 14 and 17=pregelatinized corn flour prepared by extrusion-cooking, Runs 15 and 18=refined dry milled corn flour, and Run 16=acid hydrolyzed, pergelatinized corn flour.

In these tests the corn flours were stabilized prior to being dried to a constant weight. The stabilizing agent used consisted of 0.3 parts of dilaurylthiodipropionate in combination with 0.1 part of di-tert-butyl-p-cresol per 100 parts of the flour. A separate portion of each antioxidant was dissolved in methyl ethyl ketone. After the starch was added to a conventional blender, the blender was operated at a medium speed while appropriate amounts of each of the antioxidant solutions were slowly added. The thus-treated flour was removed from the blender and dried in a hot air oven at 105°-110° C. until a constant weight was obtained which usually required about 24 hours. The dried, stabilized flours were stored for subsequent use in individual vacuum-sealed glass (Mason) jars.

The foams were oven cured at 70° C. for about 2 hours and tested for compression set. The curing characteristics and physical properties of the foams are listed in Table VI.

From these results, it can be seen that foams containing four different corn flours and no triethanolamine (Runs 13–16) had densities ranging from about 4.3 to about 4.6 lb/ft$^3$ which compares favorably with foams produced from typical standard crash pad formulae. Also, it can be seen that the density of the foam can be reduced to near 4 lb/ft$^3$ by adding small amounts, e.g., 1 part, of triethanolamine (Runs 17 and 18). Further, it can be seen that the compression set at 50% for the foams prepared in accordance with the invention were well within the accepted range of 0 to 20% for crash pads.

EXAMPLE 4

A series of foams were made with a conventional laboratory urethane foam machine (Martin Sweets, MOD MOD 3A) using various amounts of a pregelatinized corn flour prepared by extrusion-cooking. The flours were stabilized prior to being dried to a constant weight with a stabilizing agent as described in Example 3. The foam formulations for these tests are listed in Table VII.

All the ingredients, except the polyisocyanate, were premixed and introduced as one stream into the mixing head and the polyisocyanate was introduced as a separate stream into the mixing head, both streams being at a temperature of about 30° C. The resulting reaction mixture was introduced into a closeable mold to form a molded pad, approximately 12 inches by 12 inches by 1 inch thick. The foam pads were oven cured at 70° C. for approximately 2 hours. The curing characteristics and physical properties of the foams are listed in Table VIII.

The foams made in accordance with the invention (Runs 21-24) had an open cell structure with cells of uniform size. It can be seen that these foams had densities and compression set characteristics which are well within the acceptable limits for crash pads. It can also be seen that a standard crash pad formulation using a polyisocyanate having a functionality of 2.6–2.7 at a concentration corresponding to an isocyanate index of 100 (Run 20) exhibited some closed cells and severe shrinkage. On the other hand, the foams made in accordance with the invention had an open cell structure and acceptable physical properties even though an isocyanate index of 100 was used.

EXAMPLE 5

Two semi-flexible, molded machine foams were prepared in the same general manner described in Example 4. In one foam (control) a representative conventional formulation for crash pads was used and in the other (invention) a pregelatinized corn flour was used. The corn flour was stabilized, prior to being dried to a constant weight, with a stabilizing agent as described in Example 3. The following foam formulations were used:

|  | Part by Weight | |
|---|---|---|
| Ingredient | Control | Invention |
| Polyol[1] | 100.0 | 100.0 |
| Triethanolamine | 4.5 | 1.0 |
| Carbon black[2] | 2.0 | 2.0 |
| Tertiary amine catalyst[5] | 0.7 | 1.0 |
| Triethylene diamine[6] | 0.3 | 0.6 |
| Water | 2.2 | 3.6 |
| Silicone surfactant[9] | 0.5 | 1.0 |
| Corn flour | — | 43.6 |
| Polyisocyanate[4] (functionality = 2.6–2.7) | 49.1 | — |
| Polyisocyanate[8] (functionality = 2.2–2.3) | — | 65.3 |

Notes:
[1], [2] and [4] See Table I
[5], [6] and [8] See Table III
[9] See Table V The curing characteristics were observed and various physical properties of the cured finished product were measured in accordance with ASTM 1564D. The results from these tests are summarized in Table IX.

From these results, it can be seen that the semiflexible foam containing an amylaceous material and employing a polyisocyanate having a functionality of 2.2-2.3 in accordance with the invention, as compared with a standard crash pad foam, had a higher tensile strength, had more than twice the tear strength, and exhibited comparable or superior load bearing properties even though the density was approximately 23% lower. Also, the foam did not exhibit any weight loss when subjected to an autoclave treatment at 250° F. and 15 psig which indicates that the amylaceous material was well anchored inside the polymer network.

From the foregoing description, one skilled in the art can easily ascertain the essential characteristics of the invention and, without departing from the spirit and scope thereof, can make various changes and modifications to adapt the invention to various usages and conditions.

TABLE I

FOAM FORMULATIONS - EXAMPLE 1

| Formulation | Parts by Weight | | | | | |
|---|---|---|---|---|---|---|
|  | Run 1 (Control) | Run 2 | Run 3 | Run 4 | Run 5 | Run 6 |
| Polyol[1] | 100.0 | 100.0 | 100.0 | 100.0 | 100.0 | 100.0 |
| Triethanolamine | 4.5 | 4.5 | 4.5 | 4.5 | 4.5 | 2.5 |
| Carbon black[2] | 2.0 | 2.0 | 2.0 | 2.0 | 2.0 | 2.0 |
| N,N-dimethylcyclohexylamine | 0.3 | 0.3 | 0.3 | 0.3 | 0.3 | 0.3 |

TABLE I-continued

FOAM FORMULATIONS - EXAMPLE 1

| Formulation | Parts by Weight | | | | | |
|---|---|---|---|---|---|---|
| | Run 1 | Run 2 | Run 3 | Run 4 | Run 5 | Run 6 |
| Water | 2.2 | 2.2 | 2.2 | 2.7 | 3.7 | 3.7 |
| Fluorocarbon blowing agent[3] | — | 15.0 | — | 5.0 | 5.0 | 5.0 |
| Corn flour | — | 55.0 | 30.0 | 30.0 | 55.0 | 55.0 |
| Polyisocyanate[4] (functionality = 2.6-2.7) | 47.2 | 47.2 | 47.2 | 53.7 | 69.9 | 62.1 |

Notes:
[1]VORANOL 4701, marketed by Down Chemical Co., a glycerol adduct of propylene oxide having outer blocks of ethylene oxide, a molecular weight of about 5000, a primary hydroxyl group content of about 60%, and an equivalent weight per hydroxyl of about 1635
[2]BLACK 1800, marketed by Pigment Dispersions, Inc., a dispersion of 18 wt. % carbon black in polyether
[3]FREON 11B, marketed by DuPont, trichloromonofluoromethane stabilized with alloocimene
[4]MONDUR MR, marketed by Mobay Chemical Co., crude diphenylmethane diisocyanate having a functionality of 2.6-2.7.

TABLE II

FOAM CURING CHARACTERISTIC AND PHYSICAL PROPERTIES - EXAMPLE 1

| | Run 1 | Run 2 | Run 3 | Run 4 | Run 5 | Run 6 |
|---|---|---|---|---|---|---|
| CURE RATE: | | | | | | |
| Cream Time, min. | 0.4 | 0.5 | 0.5 | 0.6 | 0.4 | 0.5 |
| Rise Time, min. | 2.3 | 2.4[a] | some | 3.6[c] | 2.75[c] | 5.5[c] |
| PHYSICAL PROPERTIES: | | | | | | |
| Amylaceous Material Content, wt. % | 0 | 24 | 16 | 15 | 23 | 24 |
| Density, g/cm$^3$ | 0.089 | [b] | [b] | 0.119 | 0.120 | 0.111 |
| Density, lb/ft$^3$ | 5.54 | [b] | [b] | 7.43 | 7.52 | 6.94 |

Notes:
[a]Began to shrink at time noted
[b]Insufficient rise to measure density
[c]Inconsistent cell sizes

TABLE III

FOAM FORMULATIONS - EXAMPLE 2

| | Parts by Weight | | | | | |
|---|---|---|---|---|---|---|
| | Run 7 | Run 8 | Run 9 | Run 10 | Run 11 | Run 12 |
| Polyol[1] | 100.0 | 100.0 | 100.0 | 100.0 | 100.0 | 100.0 |
| Carbon black[2] | 2.0 | 2.0 | 2.0 | 2.0 | 2.0 | 2.0 |
| Tertiary amine catalyst[5] | 0.75 | 0.75 | 0.75 | 0.75 | 0.75 | 0.75 |
| Triethylene diamine[6] | 0.30 | 0.30 | 0.30 | 0.30 | 0.30 | 0.30 |
| Water | 3.0 | 3.3 | 3.6 | 3.6 | 3.6 | 3.6 |
| Fluorocarbon blowing agent[3] | — | — | — | 6.0 | 9.0 | 9.0 |
| Silicone surfactant[7] | — | — | — | — | — | 1.0 |
| Corn flour | 38.6 | 39.6 | 40.7 | 42.2 | 43.0 | 43.2 |
| Polyisocyante[8] (functionality = 2.2-2.3) | 48 | 52 | 56 | 56 | 56 | 56 |

Notes:
[1]through [3] See Table I
[5]THANCAT DD, marketed by Texaco Chemicals, Inc., Bis (dimethylamino propyl) ether
[6]DABCO 33LV, marketed by Air Products Corp., 33% solution of triethylene diamine in dipropylene glycol
[7]L-5307, marketed by Union Carbide Corp., a polyoxyalkylene-polysiloxane block copolymer
[8]PAPI 901, marketed by the Upjohn Co., a crude diphenylmethane diisocyanate having functionality = 2.2-2.3.

TABLE IV

FOAM CURING CHARACTERISTICS AND PHYSICAL PROPERTIES - EXAMPLE 2

| | Run 7 | Run 8 | Run 9 | Run 10 | Run 11 | Run 12 |
|---|---|---|---|---|---|---|
| CURE RATE: | | | | | | |
| Cream Time, min. | 0.16 | 0.13 | 0.13 | 0.12 | 0.12 | 0.25 |
| Rise Time, min. | 2.45 | 2.03 | 1.98 | 1.80 | 1.80 | 3.50 |
| Tack Free at 70° C., min. | 20 | 20 | 20 | 25 | 25 | 40 |
| PHYSICAL PROPERTIES: | | | | | | |
| Amylaceous Material Content, wt. % | 20 | 20 | 20 | 20 | 20 | 20 |
| Density, gm/cm$^3$ | 0.083 | 0.076 | 0.073 | 0.071 | 0.070 | 0.059 |
| Density, lb/ft$^3$ | 5.21 | 3.73 | 4.58 | 4.47 | 4.38 | 3.71 |

TABLE V

FOAM FORMULATIONS - EXAMPLE 3

| Formulation | Parts by Weight | | | | | |
|---|---|---|---|---|---|---|
| | Run 13 | Run 14 | Run 15 | Run 16 | Run 17 | Run 18 |
| Polyol[1] | 100.0 | 100.0 | 100.0 | 100.0 | 100.0 | 100.0 |
| Triethanolamine | — | — | — | — | 1.0 | 1.0 |
| Carbon black[2] | 2.0 | 2.0 | 2.0 | 2.0 | 2.0 | 2.0 |
| Tertiary amine catalyst[5] | 1.0 | 1.0 | 1.0 | 1.0 | 1.0 | 1.0 |
| Triethylenediamine[6] | 0.6 | 0.6 | 0.6 | 0.6 | 0.6 | 0.6 |
| Water | 3.6 | 3.6 | 3.6 | 3.6 | 3.6 | 3.6 |
| Silicone surfactant[9] | 1.0 | 1.0 | 1.0 | 1.0 | 1.0 | 1.0 |
| Corn flour | 43.5 | 43.5 | 43.5 | 43.5 | 43.6 | 43.6 |
| Polyisocyanate[10] (functionality = 2.2–2.3) | 62.7 | 62.7 | 62.7 | 62.7 | 65.0 | 65.0 |

Notes:
[1] and [2] see Table I
[5] and [6] See Table III
[9] L-5302, marketed by Union Carbide Corp., a polyoxyalkylene-polysiloxane block copolymer
[10] ISONATE 901, marketed by The Upjohn Co., a crude aromatic polyisocyanate comprising a mixture of diisocyanates and higher functional products, functionality = 2.2–2.3.

TABLE VI

FOAM CURING CHARACTERISTICS AND PHYSICAL PROPERTIES - EXAMPLE 3

| | Run 13 | Run 14 | Run 15 | Run 16 | Run 17 | Run 18 |
|---|---|---|---|---|---|---|
| CURE RATE: | | | | | | |
| Cream Time, min. | 0.06 | 0.12 | 0.12 | 0.12 | 0.10 | 0.10 |
| Rise Time, min. | 1.20 | 1.65 | 1.85 | 1.65 | 1.80 | 1.95 |
| Tack Free at 70° C., min. | — | — | — | — | 15 | 11 |
| Cure at 70° C. hrs. | 2 | 2 | 2 | 2 | 2 | 2 |
| PHYSICAL PROPERTIES: | | | | | | |
| Isocyanate Index | 100 | 100 | 100 | 100 | 100 | 100 |
| Amylaceous Material Content, wt.% | 20 | 20 | 20 | 20 | 20 | 20 |
| Density, g/cm$^3$ | 0.0682 | 0.0723 | 0.0735 | 0.0716 | 0.0646 | 0.0641 |
| Density, lb/ft$^3$ | 4.26 | 4.52 | 4.59 | 4.47 | 4.03 | 4.00 |
| Compression Set,% (22 hrs. at 70° C. 50% compression) | 14.9 | 11.2 | 14.3 | 14.7 | 9.5 | 8.3 |

TABLE VII

FOAM FORMULATIONS - EXAMPLE 4

| Formulation | Parts by Weight | | | | | |
|---|---|---|---|---|---|---|
| | Run 19 | Run 20 | Run 21 | Run 22 | Run 23 | Run 24 |
| Polyol[1] | (Control) 100.0 | (Control) 100.0 | 100.0 | 100.0 | 100.0 | 100.0 |
| Triethanolamine | 4.5 | 4.5 | 1.0 | 1.0 | 1.0 | 1.0 |
| Carbon black[2] | 2.0 | 2.0 | 2.0 | 2.0 | 2.0 | 2.0 |
| Tertiary amine catalyst[5] | 0.7 | 0.7 | 0.7 | 0.7 | 0.7 | 0.7 |
| Triethylene diamine[6] | 0.3 | 0.3 | 0.3 | 0.3 | 0.3 | 0.3 |
| Water | 2.2 | 2.2 | 3.6 | 3.6 | 3.6 | 3.6 |
| Silicone surfactant[9] | 0.5 | 0.5 | 1.0 | 1.0 | 1.0 | 1.0 |
| Corn Flour | — | — | 9.2 | 19.4 | 43.6 | 74.7 |
| Polyisocyanate[3] (functionality = 2.6–2.7) | 48.0 | 52.0 | — | — | — | — |
| Polyisocyanate[10] (funtionality = 2.2–2.3) | — | — | 65.0 | 65.0 | 65.0 | 65.0 |

Notes:
[1] through [3] See Table I
[5] and [6] See Table III
[9] and [10] See Table V

TABLE VIII

FOAM CURING CHARACTERISTICS AND PHYSICAL PROPERTIES - EXAMPLE 4

| | Run 19 | Run 20 | Run 21 | Run 22 | Run 23 | Run 24 |
|---|---|---|---|---|---|---|
| CURE RATE: | (Control) | (Control) | | | | |
| Cream Time, min. | 0.25 | 0.25 | 0.1 | 0.1 | 0.1 | 0.1 |
| Rise Time, min. | 1.2 | 1.1 | 0.9 | 1.1 | 1.6 | 2.1 |
| Tack Free at 70° C., min. | 1.5 | 2.0 | 10–15 | 10–15 | 10–15 | 10–15 |
| Oven Cure at 70° C., hrs. | — | — | 2 | 2 | 2 | 2 |
| PHYSICAL PROPERTIES: | | | | | | |
| Isocyanate Index | 92 | 100$^d$ | 100 | 100 | 100 | 100 |
| Amylaceous Material Content, | — | — | 5 | 10 | 20 | 30 |

TABLE VIII-continued
FOAM CURING CHARACTERISTICS AND PHYSICAL PROPERTIES - EXAMPLE 4

| | Run 19 | Run 20 | Run 21 | Run 22 | Run 23 | Run 24 |
|---|---|---|---|---|---|---|
| wt. % | | | | | | |
| Density, g/cm$^3$ | 0.0773 | 0.0716 | 0.0463 | 0.0526 | 0.0655 | 0.0828 |
| Density lb/ft$^3$ | 4.83 | 4.47 | 2.89 | 3.28 | 4.09 | 5.17 |
| Compression Set, % | | | | | | |
| (22 hrs. at 70° C., 50% | | | | | | |
| compression) | — | — | 14.6 | 18.7 | 16.0 | 19.8 |

Notes:
[d] Borderline closed cells, severe shrinkage

TABLE IX
FOAM CURING CHARACTERISTICS AND PHYSICAL PROPERTIES - EXAMPLE 5

| CURE RATE: | Control | Invention |
|---|---|---|
| Cream Time, min. | 0.15 | 0.15 |
| Rise Time, min. | 0.7 | 1.9 |
| Demold Time, min. | 4.0 | 5.0 |
| Oven Cure at 70° C., hrs. | 2 | 2 |
| PHYSICAL PROPERTIES: | | |
| Isocyanate Index | 92 | 100 |
| Amylaceous Material Content, wt. % | 0 | 20 |
| Avg. Density, g/cc | 0.1178 | 0.0901 |
| Avg. Density, lb/ft$^3$ | 7.35 | 5.63 |
| Tensile Strength | | |
| Break, psi | 18.79 | 26.71 |
| Elongation, % | 73 | 72 |
| Tear Strength, pli | 0.579 | 1.41 |
| 25% Indent Load Deflection, lb/2 in$^2$ | 11.75 | 15.5 |
| Steam Autoclave, % wt. loss | 0 | 0 |
| Compression Set, % | | |
| (22 hrs. at 70° C., 50% compression) | | |
| No post cure | 20.0 | 29.3 |
| Post cured at 100-110° C. for 24 hrs. | 10.5 | 15.9 |

I claim:

1. A process for preparing a semi-flexible, shock-absorbing polyurethane foam having an open cell structure comprising
   forming a reaction mixture including, on a parts by weight basis, 100 parts of polyether containing at least 50% primary hydroxyl terminal groups, by function, and having an equivalent weight per hydroxyl group of about 300 to about 2,000, about 5 to about 90 parts of an amylaceous material, about 2 to about 5 parts of water, about 0.1 to about 5 parts of a catalyst for the reaction between isocyanates and hydroxyl groups, and an organic aromatic polyisocyanate having a functionality of about 2 to about 2.4, the amount of said polyisocyanate being sufficient to provide an isocyanate index, factoring in all the reactive hydrogen equivalents in the reaction mixture, of about 80 to about 150; and
   allowing said mixture to react to form said polyurethane foam.

2. A process according to claim 1 wherein said polyisocyanate is a crude phosgenation product of aniline-formaldehyde condensates having a functionality of about 2.2 to about 2.3.

3. A process according to claim 2 wherein the amount of said polyisocyanate in said reaction mixture is sufficient to provide an isocyanate index of about 90 to about 130.

4. A process according to claim 1 wherein said polyether is a block copolymer of propylene oxide and another alkylene oxide containing at least 60% primary hydroxyl terminal groups, by function, and having an equivalent weight per hydroxyl group of about 1,000 to 2,000.

5. A process according to claim 4 wherein said block copolymer is a propylene oxide-ethylene oxide block copolymer with the outer block being ethylene oxide and has an equivalent weight per hydroxyl group of about 1,200 to 1,800.

6. A process according to claim 1 wherein said amylaceous material is a high starch-bearing fraction of corn, rice, wheat, barley, sorghum, potato or tapioca.

7. A process according to claim 6 wherein said amylaceous material contains less than about 1 weight % moisture.

8. A process according to claim 7 wherein said amylaceous material is a pregelatinized cereal starch or flour.

9. A process according to claim 8 wherein the amount of said amylaceous material in said reaction mixture is about 20 to about 60 parts.

10. A process according to claim 8 wherein said cereal starch or flour is corn starch or flour.

11. A process according to claim 1 wherein said catalyst is a tertiary amine, an organo metallic compound, or a mixture thereof.

12. A process according to claim 11 wherein the amount of said catalyst in said reaction mixture is about 1.0 to about 3 parts.

13. A process according to claim 1 wherein said reaction mixture includes an effective amount of a surfactant selected from the group consisting of siloxane-oxyalkylene copolymers, oxyethylated alkyl phenols, oxyethylated fatty alcohols and polyoxyalkylene block copolymers.

14. A process according to claim 1 wherein said reaction mixture includes a low boiling point organic blowing agent which is substantially inert with respect to said polyisocyanate.

15. A semi-flexible, shock-absorbing polyurethane foam having an open cell structure prepared by the process of claim 1.

* * * * *